H. MACDONALD, DEC'D.
L. B. WEST & J. W. REID, EXECUTORS.
FAUCET.
APPLICATION FILED NOV. 8, 1910.
1,138,604.
Patented May 4, 1915.
2 SHEETS—SHEET 2.
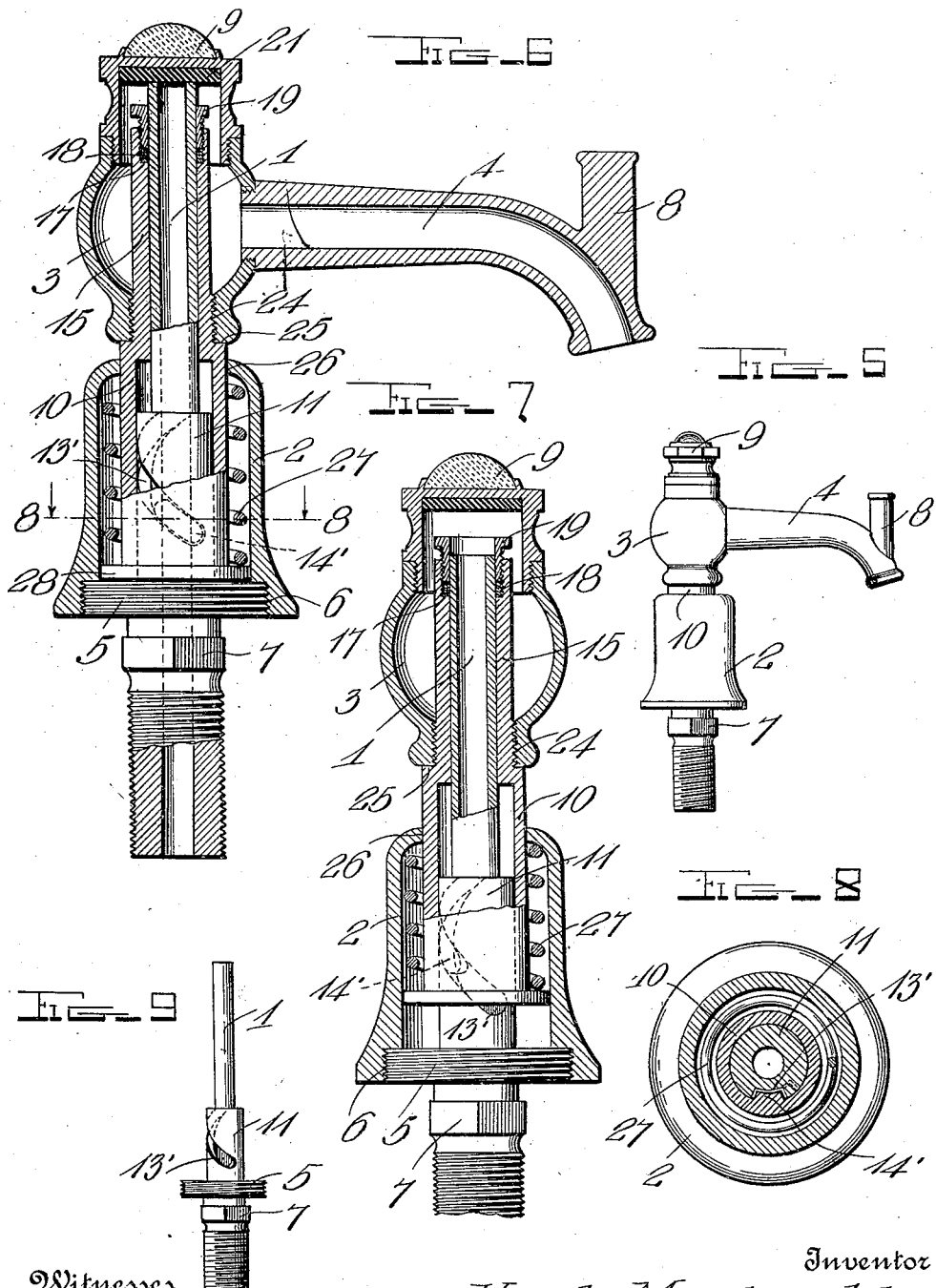
Witnesses
Inventor
Hugh Macdonald

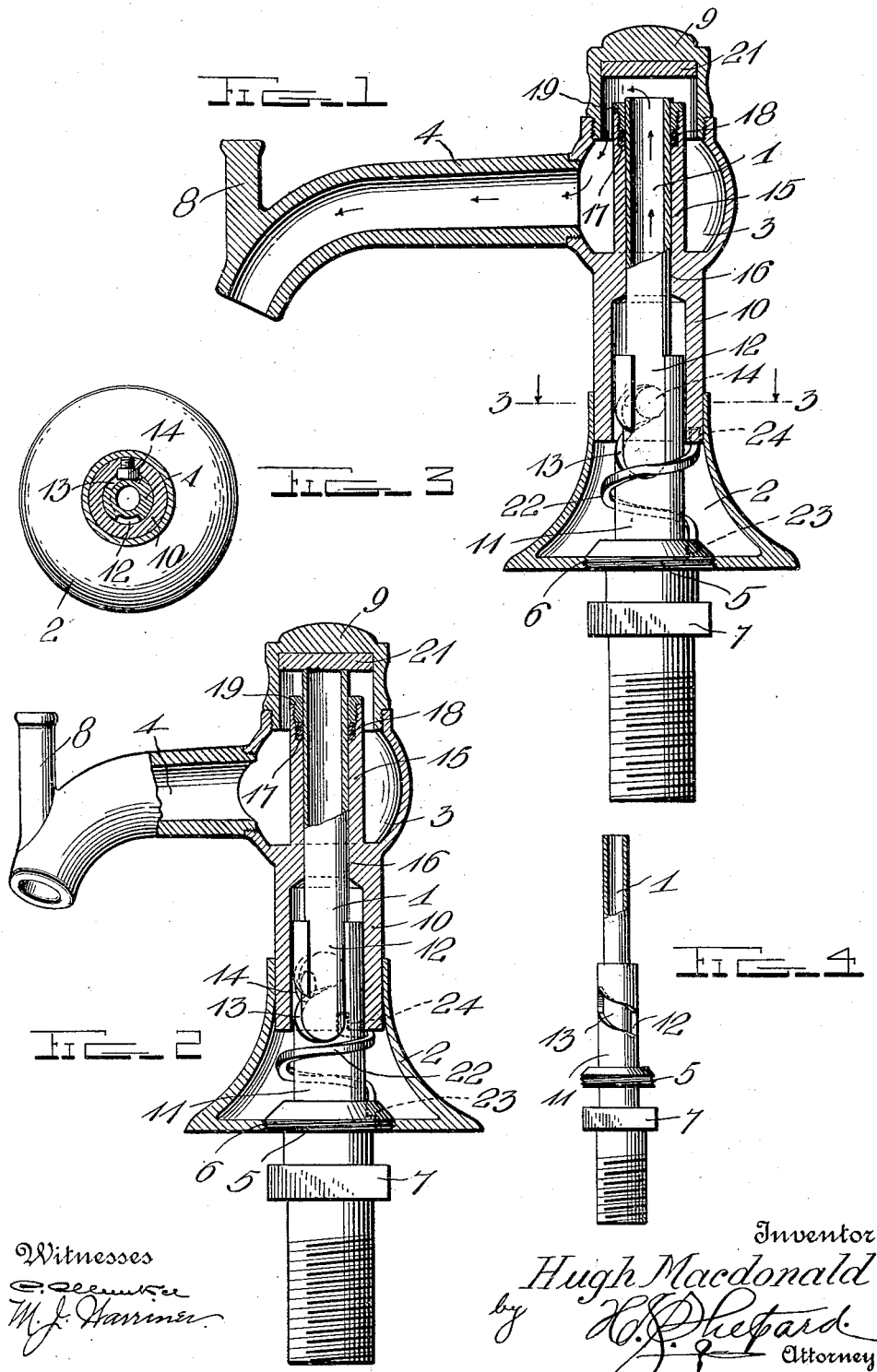

UNITED STATES PATENT OFFICE.

HUGH MACDONALD, OF DETROIT, MICHIGAN; L. BURTON WEST AND JOHN WHEELER REID EXECUTORS OF SAID MACDONALD, DECEASED.

FAUCET.

1,138,604.  Specification of Letters Patent.  Patented May 4, 1915.

Application filed November 8, 1910. Serial No. 591,273.

*To all whom it may concern:*

Be it known that I, HUGH MACDONALD, a citizen of the United States, residing at Detroit, in the county of Wayne and State of Michigan, have invented certain new and useful Improvements in Faucets, of which the following is a specification.

This invention relates to valves, and while it is capable of general use, is especially designed for use as a faucet for wash-basins, bath-tubs, sinks, laundry tubs and the like.

The several types of faucets now in general use have many defects and disadvantages; such for instance as requiring frequent renewing of the packing and washers; difficulty in obtaining access to the packing and washers, usually necessitating the services of a plumber; leakage due to wear; looseness and consequent inefficiency in the operating parts; and where a spring is employed for automatic or self seating of the valve in a faucet for hot water, the spring has always been subjected to direct contact with the water, which soon impairs the resiliency of the spring to such an extent that it becomes weak and does not properly seat the valve, whereby the faucet leaks and wastes the hot water. This last disadvantage is very objectionable and expensive in hotels and the like where a great number of hot water faucets are in use.

In view of the disadvantages above pointed out, it is the object of the present invention to obviate each and every one of such objections; and to provide a faucet which is inexpensive, can be readily fitted in place in the same manner as ordinary standard faucets, is efficient in supplying and shutting off the water, readily manipulated and conveniently taken apart for the purpose of replacing the packing and valve washer when worn or damaged.

The valve seat of the present invention is of relatively small area, whereby little or no chance is given for the collection of grit thereon, wherefore the life of the valve washer is materially prolonged.

According to present practice, automatic or self-closing faucets are specially constructed, and hand operated faucets cannot be converted into self closing faucets without material alteration.

It is a very important object of the present invention to enable the convenient conversion from a self closing to a hand closing faucet, and vice versa, merely by the introduction or removal of a spring, the parts of the faucet being so constructed and arranged as to admit of this slight change without in any manner altering the faucet or requiring the assistance of a plumber, and also without impairing the efficiency of the faucet. In this connection, the spring is housed against the action of the hot water so as not to be subjected to contact therewith, and at the same time is housed from view and accidental displacement and damage by the handling of the faucet.

Exposed joints are also eliminated in the present invention, thereby obviating leakage, and also preventing drippings and splashings from running back into the water passage of the faucet, whereby a thoroughly sanitary faucet is provided.

With these and other objects in view, the present invention consists in the combination and arrangement of parts, as will be hereinafter more fully described, shown in the accompanying drawings and particularly pointed out in the appended claims, it being understood that changes in the form, proportion, size and minor details may be made, within the scope of the claims, without departing from the spirit or sacrificing any of the advantages of the invention.

In the drawings,—Figure 1 is a longitudinal sectional view of one embodiment of the present invention in open position for the free flow of water. Fig. 2 is a similar view showing the faucet closed. Fig. 3 is a cross sectional view on the line 3—3 of Fig. 1. Fig. 4 is a fragmentary detail view of the tubular stem. Fig. 5 is a side elevation, on a reduced scale of another embodiment of the invention. Fig. 6 is a longitudinal sectional view of the embodiment shown in Fig. 5 on the same scale as Fig. 1, showing the faucet closed. Fig. 7 is a similar view showing the faucet open. Fig. 8 is a cross sectional view on the line 8—8 of Fig. 6. Fig. 9 is a detail side elevation, on a reduced scale, of the form of tubular stem shown in Figs. 6 and 7.

Like characters of reference indicate corresponding parts in each of the several figures of the drawings.

The present embodiment of this invention includes three main parts, viz., the tubular stem 1, which communicates with the supply pipe, the boss 2, which houses a portion of the stem and affords an abutment or shoulder to lie against the basin or the like to which the faucet is applied, and the casing 3, carrying the discharge spout 4, and housing the stem.

The lower end of the stem is of any ordinary or preferred form, that shown in the drawing being threaded at its lower extremity, above which is an annular threaded shoulder 5, designed to fit the threaded wall of the central opening 6 in the bottom of the base or boss 2. For construction purposes and convenience in assemblage, it is preferred to have the boss 2 and the stem 1 separate, but it is of course apparent that they may be integral or permanently connected. A wrench head portion 7 may be provided upon the stem between the threaded extremity and the shoulder 5.

The base 2 is a hollow truncated cone open at its top, and rising a suitable distance above the shoulder 5, but terminating considerably short of the top of the stem, there being an annular space between the base and the stem.

The casing 3, includes a central body portion, shown in the accompanying drawing as substantially spherical in shape, from which the spout 4 projects laterally, and terminates in a down-turned discharge and having an upstanding handle 8, for a purpose as will hereinafter appear. The open top of the body is normally closed by a removable cap 9. A cylindrical sleeve 10 depends from the body and fits slidably and rotatably in the annular space between the stem and the base into which it projects for a suitable distance.

Referring now more particularly to Figs. 1-4, inclusive, it will be noted that from the shoulder 5 upwardly into the sleeve 10, the stem is larger in diameter, at 11, than it is above. In this enlarged portion is a longitudinal groove or channel 12, having its upper end opening through the upper end of the enlargement. A spiral groove or guideway 13, leads upwardly from the bottom of the groove 12, with which it communicates. An internal stud or projection 14 projects transversely from the sleeve 10, and works in the spiral groove 13.

When assembling the stem and casing, the stud 14 is entered through the open top of the groove 12, and thereafter the stem and casing are relatively rotated to bring the stud into the spiral groove 13. After being assembled, any relative rotation of the stem and casing, will result in a vertical reciprocation of the casing upon the stem, as the latter is held fixed upon the stand while the casing is free to move and will be drawn up and down by the stud 13 working in the spiral groove 14. This up and down movement of the casing is what opens and closes the faucet, as will be hereinafter explained.

For the guidance of the casing in its reciprocatory movements, there is a tubular bearing 15 located concentrically in the casing with its opposite ends open, and connected at its lower end to the casing by means of an annular web or flange 16, located a suitable distance above the top of the enlarged stem portion 11 so as not to engage the latter and stop the movement of the casing. This tubular guide member 15 has a working fit on the stem 1 to permit of the up and down movement of the casing, and the guide and stem are cylindrical to permit rotation of the casing on the stem. By means of this member 15, a long bearing is afforded the casing so as to prevent tilting of the latter and binding thereof on the guide 15. At its top, the bore of the tubular guide member 15 is enlarged to form a seat 17, for the reception of packing 18, held in place by a gland 19, threaded into the enlargement. This stuffing box or packing prevents leakage downward between the stem 1 and the guide member 15.

For convenience in assembling the faucet, the casing 3 is provided with the removable top or cap 9 suitably threaded to the casing, and carrying an internal packing disk or washer 21, constituting a valve to be seated upon the valve seat afforded by the top of the tubular stem 1, as shown in Fig. 2 of the drawing.

For an understanding of the operation of the present faucet, reference is had first to Fig. 2 of the drawing, which shows the faucet closed, the casing being at its lower limit with the valve 21 engaging the valve seat and shutting off the passage of water upwardly through the tubular stem 1. The casing is held against upward movement under the pressure of the water by reason of the stud or pin 14 fitting in the spiral groove 13. To open the faucet, the handle 8 or spout 4 is grasped and the entire casing turned slightly, in this instance to the left, whereby the casing will also be elevated by reason of the stud 14 traveling upwardly in the spiral groove or guideway 13. When the stud reaches the upper closed end of the guideway, the faucet will be entirely open, as shown in Fig. 1 of the drawing, and the water will be free to pass outwardly through the top of the tubular stem 1, thence downwardly into the spherical body portion of the casing and finally outward through the spout 4. By reverse movement of the casing, the latter may be drawn downwardly until the valve 21 seats against the top of the tubular stem 1, whereby the faucet will against be closed.

As thus far described, the faucet must be manually operated to open and close the same. In order that the faucet may be automatic or self closing, there is provided a coiled or helical spring 22 coiled about the lower part of the stem within the base 2 and between the bottom of the sleeve 10 and the bottom of the base, the lower end of the spring being fitted in a seat or recess 23 in the shoulder or flange 5, and the upper end fitted in a seat or recess 24 in the bottom edge of the sleeve 10. When the faucet is closed the spring is in its normal untensioned condition, but when the faucet is turned to lift the casing and permit the flow of water, the spring will be distorted and under tension, because its upper end is carried around by the rotating movement of the sleeve 10. Just as soon as the spout 4 or handle 8 is released, the spring will immediately rotate the casing back to its normal closed position.

It is a very important feature of the present invention that the spring 22 may be used or omitted without requiring any change or alteration whatsoever in any of the parts of the faucet, and furthermore, the spring is housed within the base 2 and is not subjected to the action of the water.

It will here be explained that, when the faucet is assembled, the parts are so proportioned that the valve 21 will seat upon the top of the stem 1 before the stud 14 comes into the bottom of the longitudinal groove 12, and therefore the casing cannot come off so long as the cap 9 is in place. To take the faucet apart, for introducing or removing the spring 22, or to have access to the packing 18, the cap 20 is removed, the casing is rotated so as to bring the stud 14 into the bottom of the groove 12, whereupon the casing is lifted vertically so as to draw the stud 14 upwardly and out through the open top of the groove 12.

In the embodiment of the invention shown in Figs. 5 to 9, inclusive, the construction is quite similar to that shown in Figs. 1 to 4 inclusive, with a few exceptions, as will now be explained. Instead of having the parts 3, 15 and 10 integral as in Figs. 1 and 2, the part 3 is separate from the integral parts 10 and 15, and is threaded to the part 15 as at 24, there being an external annular shoulder 25 formed by the top of the enlarged portion 10 against which the bottom of the casing 3 engages as a stop. It will of course be understood that this same detachable construction may be employed in the embodiment of the invention shown in Figs. 1 and 2 whenever desired.

In the form shown in Figs. 6 and 7 it will be noted that the cylindrical sleeve 10 extends down to the shoulder 5 in the closed position of the valve. This sleeve 10 works through a guide opening 26 in the closed top of the base 2, and there is an annular space between the base 2 and the sleeve 10, within which is housed a helical spring 27 bearing at its upper end against the closed top of the base 2 and at its lower end upon an external annular shoulder 28 upon the bottom of the sleeve, said shoulder having a working fit within the base 2 so as to guide the sleeve in its up and down movement.

In the enlarged portion 11 of the stem 1 there is a spiral groove 13' which is closed at its bottom and opens through the top of the enlarged portion 11. The sleeve 10 is provided with an internal projection 14' which works in the groove 13'.

The operation of the embodiment of the invention shown in Figs. 6 to 9 inclusive, is precisely the same as explained for Figs. 1 to 4 inclusive.

What is claimed is:—

1. A valve comprising a tubular stem for the passage of a fluid, the upper end of the tubular stem being open and forming a valve seat, a casing embracing the tubular stem and having a rotatable and endwise movement thereon, said casing being divided into an upper annular chamber and a lower annular chamber, the upper chamber surrounding the stem and in communication with the open top thereof, the upper closed end of the casing constituting a valve which is seated upon the top of the stem in the lowermost position of the casing, a spiral guide between the lower portion of the casing and the stem and a spring for yieldingly and normally holding the casing at its lowermost limit.

2. A valve comprising a tubular stem for the passage of water, an annular base surrounding the stem with an annular space between them, a casing in communication with the stem and having an outlet, a portion of the casing being located in the annular space between the stem and the base, and the casing having a movement upon the stem to open and close communication therewith.

3. A valve comprising a tubular stem for the passage of fluid, an annular base carried by the same with an annular space between them, a casing in communication with the stem and having a portion located in the annular space between the stem and base, and a stud and spiral groove engagement between the stem and casing to impart an endwise movement to the casing when the latter is rotated.

4. A valve comprising a tubular stem for the passage of fluid, one end of the stem constituting a valve seat, a base carried by the stem and having an annular space between the stem and base, a casing rotatably and slidably embracing the valve seat end portion of the stem and having a cylindrical part fitting in the space between the stem and base, a valve carried within the casing and arranged to seat upon the valve seat, and a stud and spiral groove engagement between the stem and the cylindrical portion of the casing to impart an endwise movement to the latter when it is rotated.

5. A valve comprising a tubular stem for the passage of fluid, an annular base surrounding the stem with an annular space between them, a casing provided with an outlet and movably embracing the stem and in communication therewith, and a spring housed within the base in engagement with the casing and arranged to automatically move the latter to close the valve.

6. A valve comprising a tubular stem for the passage of fluid, an annular base surrounding the stem with an annular space between them, a casing embracing the stem in communication therewith and provided with an outlet, said casing having a rotatable and an endwise movement upon the stem, and a spiral spring embracing the stem and housed within the base and disposed to automatically close the valve.

In testimony whereof I affix my signature, in presence of two witnesses.

HUGH MACDONALD.

Witnesses:
WALTER S. WHEELER,
D. MAXWELL.

Copies of this patent may be obtained for five cents each, by addressing the "Commissioner of Patents, Washington, D. C."